United States Patent [19]
Andreasson et al.

[11] Patent Number: 5,963,854
[45] Date of Patent: Oct. 5, 1999

[54] ANTENNA AMPLIFIER

[75] Inventors: Krister Andreasson; Mattias Nystrom, both of Stockholm; Farshid Ghasemzadeh, Kista, all of Sweden

[73] Assignee: LG Products AB, Solna, Sweden

[21] Appl. No.: 08/809,071

[22] PCT Filed: Jul. 12, 1996

[86] PCT No.: PCT/SE96/00951

§ 371 Date: Mar. 14, 1997

§ 102(e) Date: Mar. 14, 1997

[87] PCT Pub. No.: WO97/04534

PCT Pub. Date: Feb. 6, 1997

[30] Foreign Application Priority Data

Jul. 14, 1995 [SE] Sweden ................................. 9502604
Feb. 19, 1996 [SE] Sweden ................................. 9600604

[51] Int. Cl.⁶ ........................................................ H04B 1/48
[52] U.S. Cl. ............................... 455/82; 455/83; 333/134
[58] Field of Search .................................. 455/73, 78, 80, 455/84, 82, 83; 333/124, 132, 134, 202, 206, 207

[56] References Cited

U.S. PATENT DOCUMENTS

| | | | |
|---|---|---|---|
| 5,109,536 | 4/1992 | Kommrusch ............................. | 455/82 |
| 5,239,279 | 8/1993 | Turunen et al. ......................... | 455/82 |
| 5,241,693 | 8/1993 | Kim et al. ............................... | 455/80 |
| 5,604,470 | 2/1997 | Atokawa ................................. | 455/83 |

FOREIGN PATENT DOCUMENTS

| | | |
|---|---|---|
| 2656449 | 6/1991 | France . |
| 2 240 906 | 8/1991 | United Kingdom . |
| 2 28 029 | 3/1995 | United Kingdom . |
| WO 89/09498 | 10/1989 | WIPO . |
| WO 92/15123 | 9/1992 | WIPO . |

OTHER PUBLICATIONS

G.L. Matthaei et al., "Microwave Filters, Impedance-Matching Networks, and Coupling Structures", pp. 497–500, Artech House Books, Dedham, MA.

Primary Examiner—Thanh Cong Le
Attorney, Agent, or Firm—Young & Thompson

[57] ABSTRACT

An antenna amplifier utilizes integrated dual duplex filters having a first filter branch for allowing through a transmitter band (Tx) between an uplead and an antenna, a second filter branch (Rx1) for allowing through a receiver band (Rx) from the antenna to an output element (3), a third filter branch for allowing through the receiving band (Rx) from an input element (4) to the uplead, and a low noise amplifier whose input is connected to the output element and whose output is connected to the input element. The low noise amplifier (LNA) is preferably both constructed and connected by means of filter-technical and circuit board-technical methods.

19 Claims, 17 Drawing Sheets

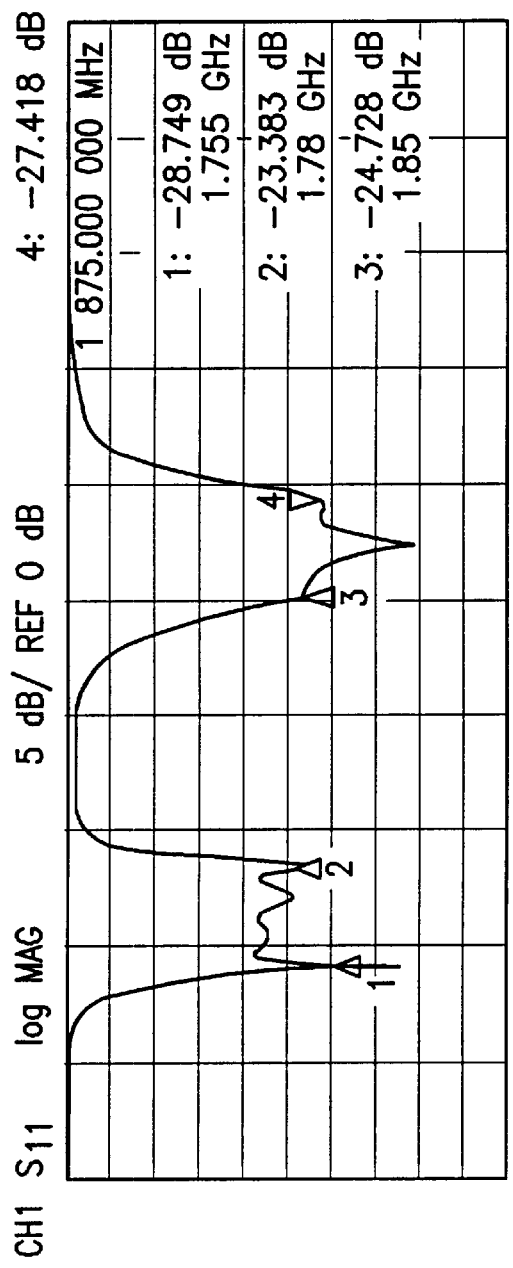
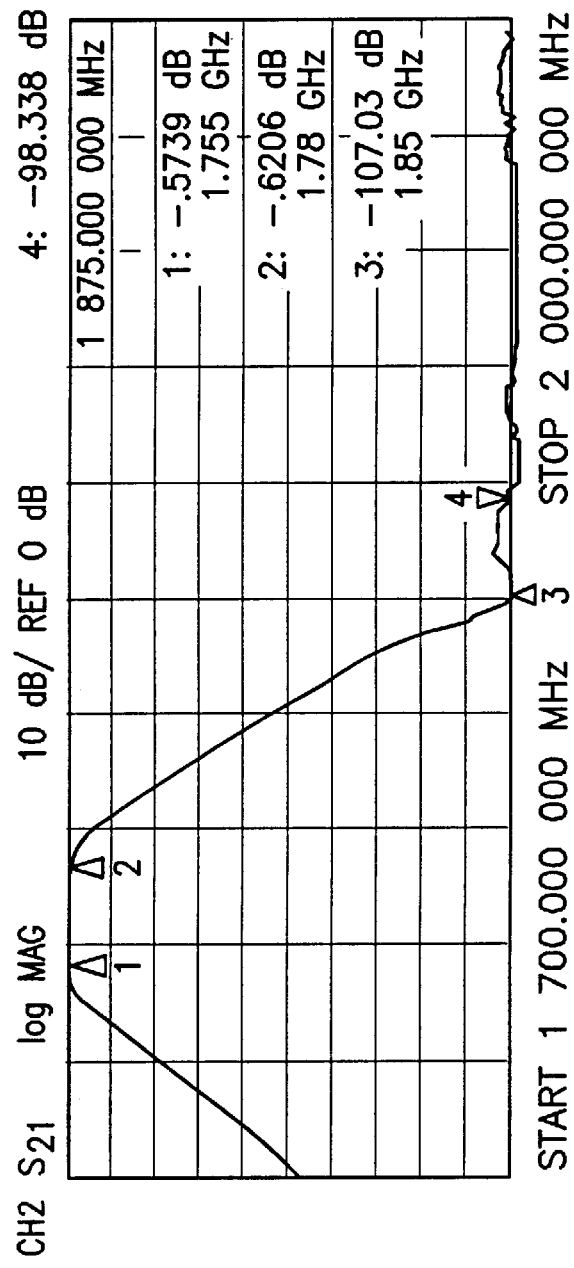
FIG. 8A
FIG. 8B

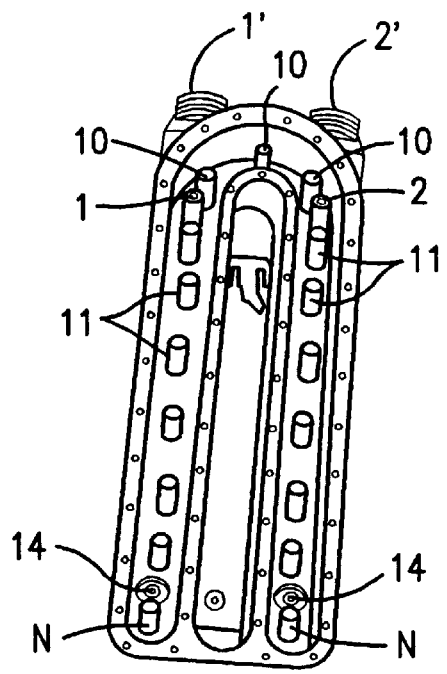
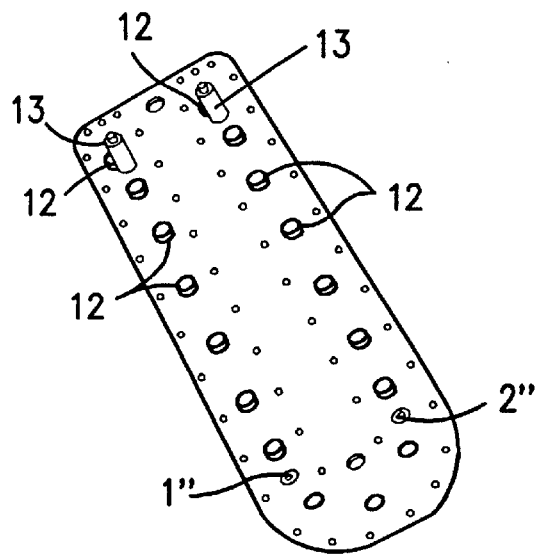
FIG. 10A
FIG. 10B
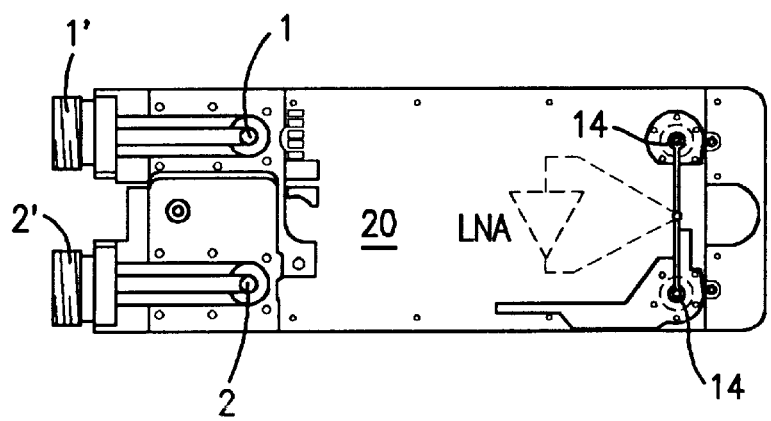
FIG. 11

ANTENNA AMPLIFIER

FIELD OF THE INVENTION

The invention relates to an antenna amplifier.

DESCRIPTION OF THE BACKGROUND ART

In mobile communication systems, it is normal for a fixed station to transmit within a given frequency range and to receive within a frequency range that differs from the transmitting range. In certain applications, both transmission and reception are effected with the same antennas. The reason for this is to be found in the general desire to operate from a base station in a mobile communications tower in an area that is divided into separate sectors while utilizing diversity. The use of separate antennas for transmission and reception would result in an excessively large number of antennas.

In view of the relatively long downleads that are involved in this regard, there is an interest in amplifying the received signals already in connection with and close to the antenna, particularly in the case of fixed tower-mounted stations. In this regard, it is necessary to mutually separate the received incoming signals with the aid of filters, which must have the highest quality in order to bring losses down to a minimum. In an earlier known construction, the transmitter signal has been separated from the receiver signal with the aid of two signal paths, one for the transmitter signal and one for the receiver signal, each of which is connected to respective antenna and uplead sides through a duplex filter. Each duplex filter is comprised of two filters tuned to respective transmission and reception frequency bands. The advantage with this construction is that only one downlead to the ground mounted station is required. However, it can also be chosen to uplead the transmission power and download the receiver signal in a respective coaxial cable, thereby enabling a saving in ground positioned filter stages.

SUMMARY OF THE INVENTION

An object of the present invention is to provide an improved antenna amplifier. Among other things, it is desired to therewith improve the isolation or separation between transmitter and the receiver bands, therewith to reduce losses in the transmission bands and to reduce non-linearity in the transmitter band, and also to reduce the occurrence of spurious intermodulation products and to obtain the least possible reception noise factors and the most effective transmission emission and also to achieve low weight and small size.

Such advantages are achieved in accordance with the invention with an antenna amplifier of the kind defined below.

According to one embodiment of the invention, there is provided an antenna amplifier which includes sequentially in a row a first reception band filter, a transmission band filter and a second receiver band filter, said filters being built-up in a comb-line structure. An amplifier-connected output and input are provided at respective ends of the row. Coupling means are placed on both sides of the midway transmitter band filter for connection to an antenna and to a downlead to a fixed station. Also included is an arrangement in which the first and the second receiver band filter are placed side by side-in a respective cavity with the transmitter band filter mounted perpendicular thereto in a separate cavity, wherein the connection therebetween is effected via apertures and inputting first resonators.

An antenna amplifier of the kind in question is meant to be mounted in a tower, which may have a height of 60 meters, where servicing is effected by service personnel climbing a ladder and working outdoors. Accordingly, an object of the present invention is to provide an amplifier of the aforesaid kind which can be readily handled, easily replaced and which is effective in operation. It shall also be possible to mass-produce the antenna amplifier at reasonable cost, in view of the large number of amplifiers required to expand or extend mobile telephony traffic. The amplifier shall be easy to connect-up, insensitive, and as small and as light as possible.

An important aspect in this regard resides in the desire to fully utilize the possibilities that are afforded by integrated circuits when they can be connected directly to the filter devices without requiring, for instance, coaxial coupling devices and while maintaining coupling losses and distortion at the smallest possible levels.

These objects are achieved in accordance with the invention with an antenna amplifier of the kind set forth below.

Two essential features in genuine combination are contributory in this regard: The construction of a comb-line filter connected via connector pins for its inputs and outputs and accommodated in a folded cavity of horseshoe configuration cavity defined by a metal casing, and a circuit board mounted amplifier with the input adaptively connected to the filter via a connector pin incoming to the circuit board at right angles. This construction provides on the input an excellent low-loss connection, particularly in comparison with a connection made to a separate amplifier via a coaxial connection. The combination is completed by mounting the circuit board in a rigid metal construction that accommodates the actual filter.

The inventive combination can be utilized either with a combination having a common upload and download, or with separate uploads and downloads. In the former case, a filter is not only required to separate-out the receiver signal, but also to pass the amplified receiver signal to the common upload and download.

With regard to the combination that includes a common upload and download, there is provided in accordance with one variant a filter device in which two parallel filters have inputs which lie close to one another and which are also mutually connected to another filter without the need of hybridizing between Coax Cavity and Comb-line. It has been found that the invention enables the three filters and the aforesaid two input/outputs to be connected to a single cavity that has two mutually parallel straight parts which are bridged by a curved part that accommodates the center filter.

Among the improvements desired are the isolation between the transmitter and receiver bands, reduction in losses in the Tx path and a reduction in the non-linearity in the transmitter band, which is dedicated towards reducing the occurrence of spurious intermodulation products, to achieve the smallest possible noise factor for the reception and the maximum possible effective emission for the transmitter, in addition to low weight and small size.

The actual amplifier is mounted on a circuit board placed adjacent the cavity, and connections are made through pin connectors, either directly with inductive coupling or with capacitive coupling to circuit board conductors of the microstrip or stripline type and with appropriate inpedance match.

BRIEF DESCRIPTION OF THE DRAWINGS

The invention will now be described in more detail with reference to a non-limiting exemplifying embodiment thereof and also with reference to the accompanying drawings, in which

FIGS. 10A, 10B and 11 are perspective views of a filter construction;

FIG. 1 illustrates schematically a known antenna amplifier connected between an antenna and an uplead (Tower Mounted low noise Amplifier, TMA). There are obtained with the aid of two duplex filters two conductor branches, one branch Tx for the transmitter signal and another branch Rx for the received signal, it being possible to mutually separate the signals through filters by virtue of the signals lying in different frequency bands. Such broadband filters may be comprised of resonators having slightly different tuning frequencies in comb-line filters. It will be evident that four such filters are included in this configuration, namely one bandpass filter for the Tx frequency band and one bandpass filter for the Rx frequency band in each duplexer. The low noise amplifier LNA is connected in the Rx branch.

Figure 2:
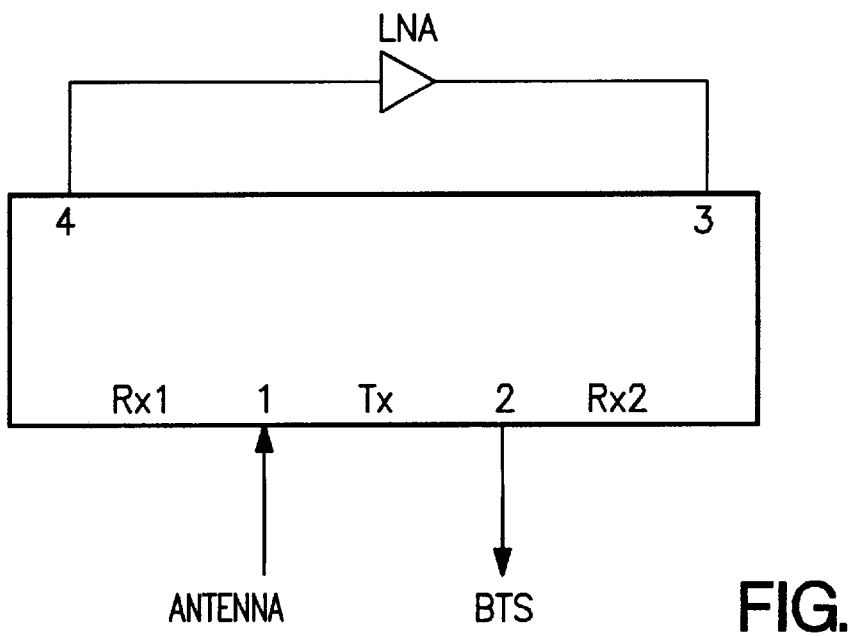
FIG. 2 is a schematic diagram illustrating an antenna amplifier constructed in accordance with the principles of the invention.

In accordance with the invention, which is a combination of two duplex filters having a common Tx filter in one and the same construction, one of four filters is now eliminated in accordance with the FIG. 2 illustration. The transceiver connection BTS is therewith able to deliver transmitter power to the antenna solely via Tx, tuned to its frequency band. The signal received by the antenna can only reach the input on the low noise amplifier LNA via Rx1, the output signal of LNA passing to BTS via the filter Rx2.

Figure 1:
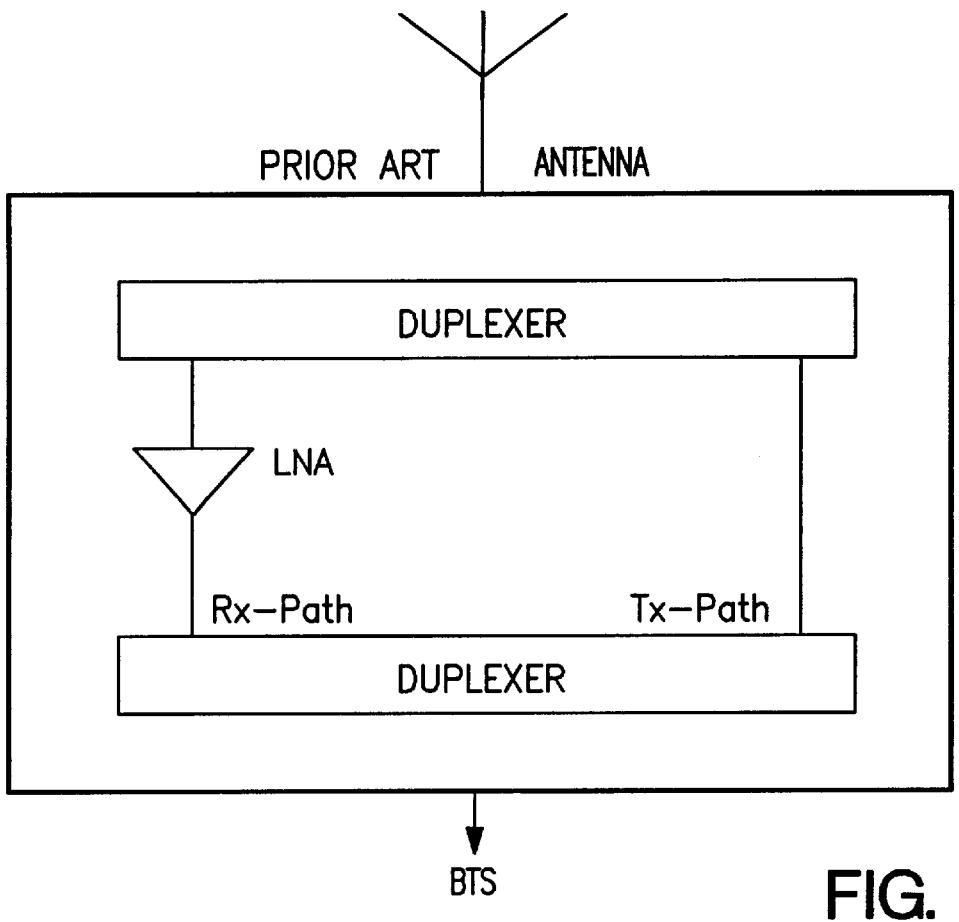
FIG. 1 is a schematic diagram illustrating an antenna amplifier for duplex operation in accordance with an earlier known technique.

A comparison with FIG. 1 shows that in addition to eliminating one filter, the number of connection points in the Tx path is reduced from four to two. With regard to the Tx path, the connection losses are halved in principle. This results in an improvement in ERP (Effective Radiative Power).

It is also possible to integrate filter and amplifier, meaning that the amplifier is connected directly to the filter without requiring cables and cable connections. This can be achieved with a combination of filter technology and circuit board technology (stripline or microstrip). Contact and cable losses upstream of the LNA input are eliminated and lower noise factors are achieved.

Description of a First Embodiment

Figure 3A:
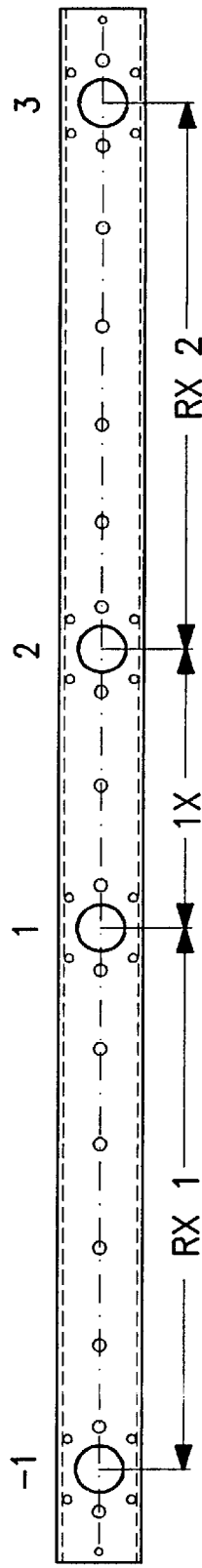
FIG. 3 presents schematic views of one embodiment of an inventive filter combination.
Figure 3B:
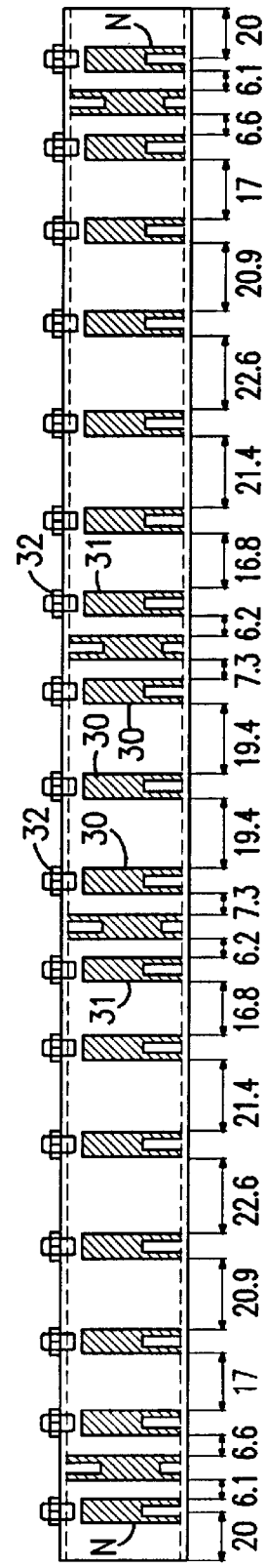
Figure 3C:
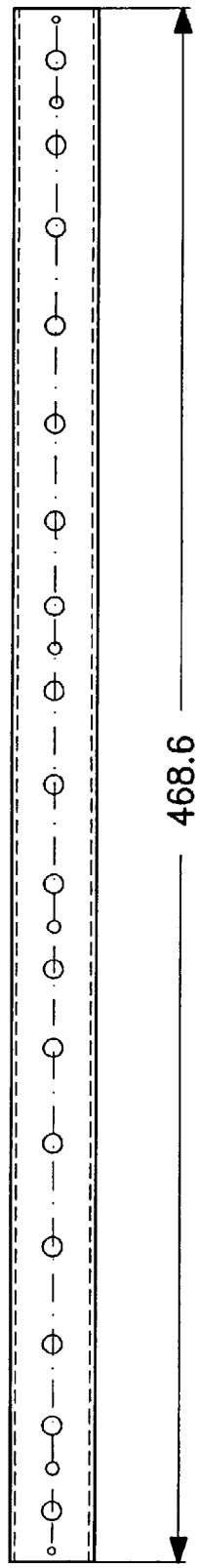

A specific embodiment of a filter combination of the aforesaid kind is shown in FIG. 3, in which measurements have been inserted in millimeters. Part-Figures A, B and C are respective views of the upper side, inside and underside of an internally silvered box having connections 1, 2, 3, 4 with intermediate filters Rx1, Tx and Rx2 respectively. This arrangement is a so-called comb-line structure having three resonators 30 which define the Tx pass band and five resonators 31 for the Rx pass band. Steepness in the Rx pass band is further increased by notch filters N at the outermost extremities. Fine adjustments to the resonators are made with the aid of adjuster screws 32, shown schematically in view C. As will be realized by the skilled person, the filter combination appears as a closed right-angled box with coaxial contacts projecting out from the surface A and adjuster devices from the opposite surface C.

In one advantageous embodiment, the coaxial connections 1 and 4 can be replaced with recesses adapted for connection to striplines or the like mounted on a low noise amplifier board placed on the outside of the box (not shown).

The filter box may be of moderate length with regard to frequencies within the frequency band 1700–1900 MHz. In the case of frequency bands between 800–1000 MHz, however, the length of the construction will be roughly twice as large and will well exceed one meter. It is therefore of interest to be able to fold the construction to obtain a shorter length. The connections 3 and 4 would then be closer together, which would further facilitate their connection to one and the same low noise amplifier board.

Description of a Second Embodiment

Figure 4:
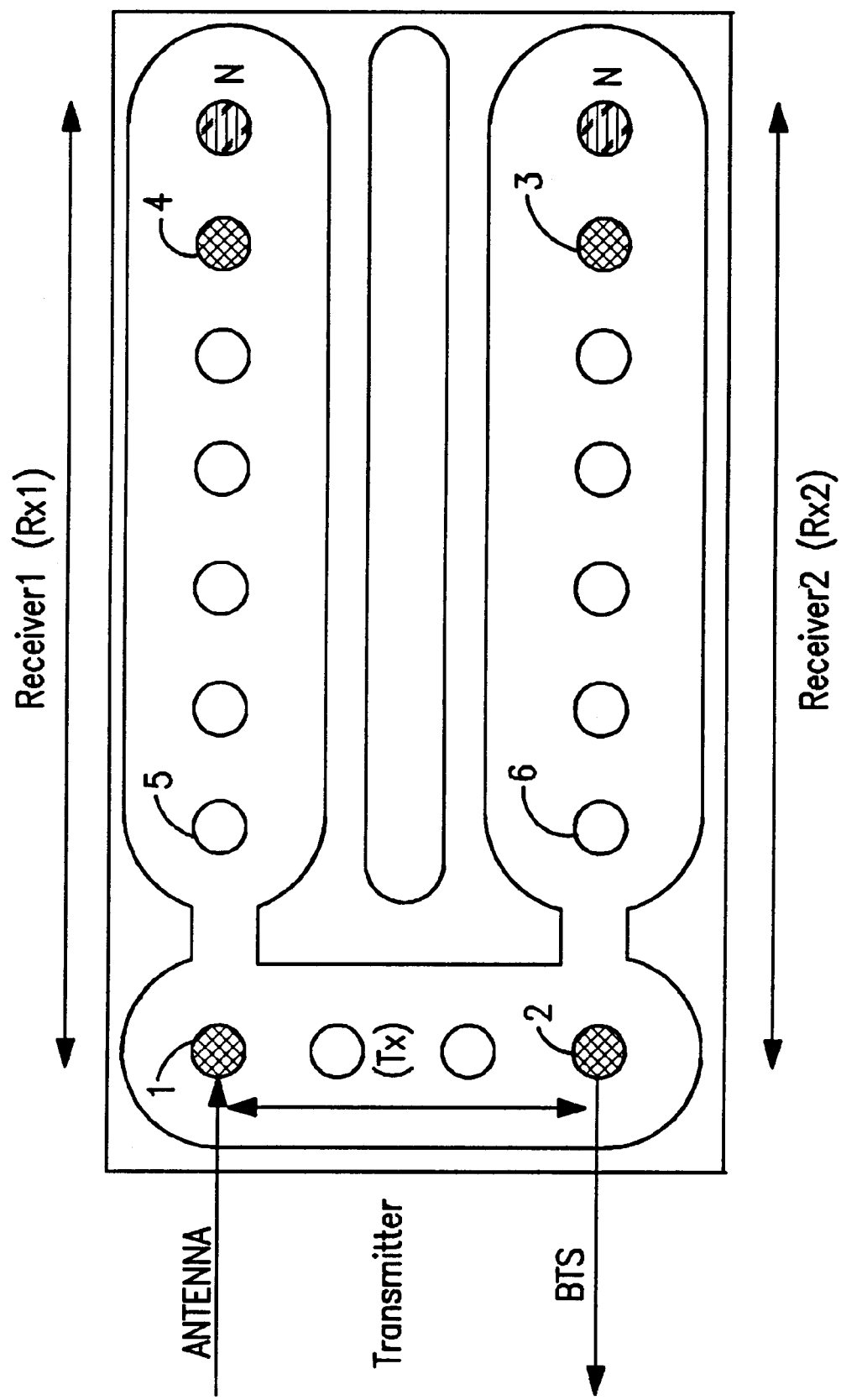
FIG. 4 illustrates an advantageous embodiment of a filter combination.

The aforesaid basic concept has been developed to produce the filter combination shown in FIG. 4, this combination having the form of a hybrid between a Coax Cavity and a Comb-line. The antenna and transceiver coupling or inputting elements are arranged in a cavity together with the Tx filter, whereas the Rx filters are each mounted in a respective parallel cavity, wherein inputting to these coupling elements 1 and 2 is effected via apertures and inputting first resonators. The coupling elements 3 and 4 at opposite ends of the cavities are now located at a comfortable distance apart, which facilitates integrated capacitive coupling of a circuit-board mounted low-noise amplifier, with the high adaptive precision, etc., possible with this technique, as illustrated schematically in FIG. 5. This connection setup minimizes losses and enables an optimized low noise factor to be obtained with respect to the receiving band Rx.

As mentioned in the introduction, the mutual isolation or separation of the frequency bands Tx and Rx is one of the important factors. This can be achieved in principle either with the aid of filters that have a high pole number, which is combined with correspondingly high losses however, or with fewer poles and the inclusion of extra zero poles. Accordingly, in the constructions shown in FIGS. 3 and 4, there have been inserted in the coupling elements 3 and 4 notches N which function as narrow-band band stop filters which are tuned to a tangential frequency between the Rx and the Tx bands. Because these elements are loss-free in respective pass bands, filter losses, if any, will be minimized.

As before mentioned, the function of the coupling or inputting elements 3 and 4 is to couple the signal between LNA and Rx filters, although they are also used to connect-up the notches N at the same time. Another important advantage afforded by this type of coupling element is that the third order intermodulation products (IM3) are minimized. IM3 is a measurement of the linearity of the unit.

Figure 5:
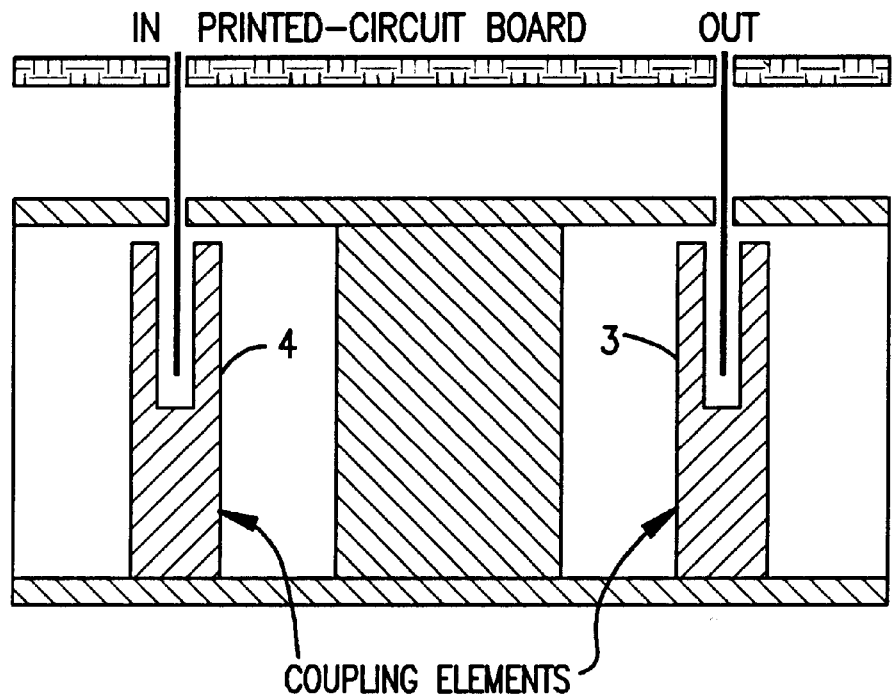
FIG. 5 illustrates one type of amplifier coupling with low losses.
Figure 6:
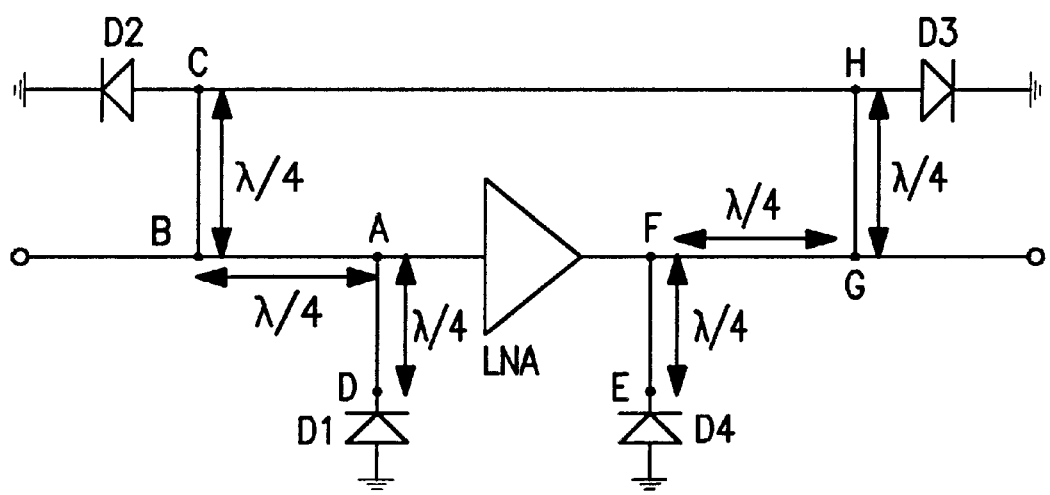
FIG. 6 illustrates an advantageous bypass coupling means of an amplifier unit.

Because the low noise amplifier is a device that has active components, it may very well break down. In order to ensure that the system will function nevertheless, it is known to provide a facility in which the amplifier can be by-passed through a system of coaxial relay contacts. This solution is expensive, however, and is not absolutely reliable. Consequently, in accordance with a preferred embodiment, an active by-pass is provided adjacent a low noise amplifier mounted on a circuit board using to this end forwardly biassed diodes as shown in FIGS. 5 and 6. Elimination of the forward bias on the diodes will bring the diodes to a high ohmic state and result in coupling-in the by-pass.

When all of the diodes in FIG. 6 are low ohmic, D2 will cause the point C to be short-circuited to earth. The quarter wavelength conductor transforms this short circuit to an open conductor in point B. The same applies to D3 in point G. The conductor that joins the diodes D2 and D3 therewith has a negligible influence. D1 results in a short circuit at D, which is transformed to an open conductor in point A, which in turn results in transformation to a short circuit in point B (the same applies to the diode D4 and the point G). The signal will therewith pass through LNA. In the event of a fault, the bias on the diodes is choked so as to bring the diodes to a high ohmic state. D2 and D3 will not therewith influence the by-pass line, and because D1 brings about an open line in point B the signal will proceed via the by-pass line. This coupling results in minimum losses when the by-pass line is disconnected, particularly when compared with conventional switching devices provided with relay contacts, which are also complicated and extremely expensive in comparison with the cost entailed by the four diodes on a circuit board.

EXAMPLE

Figure 7A:
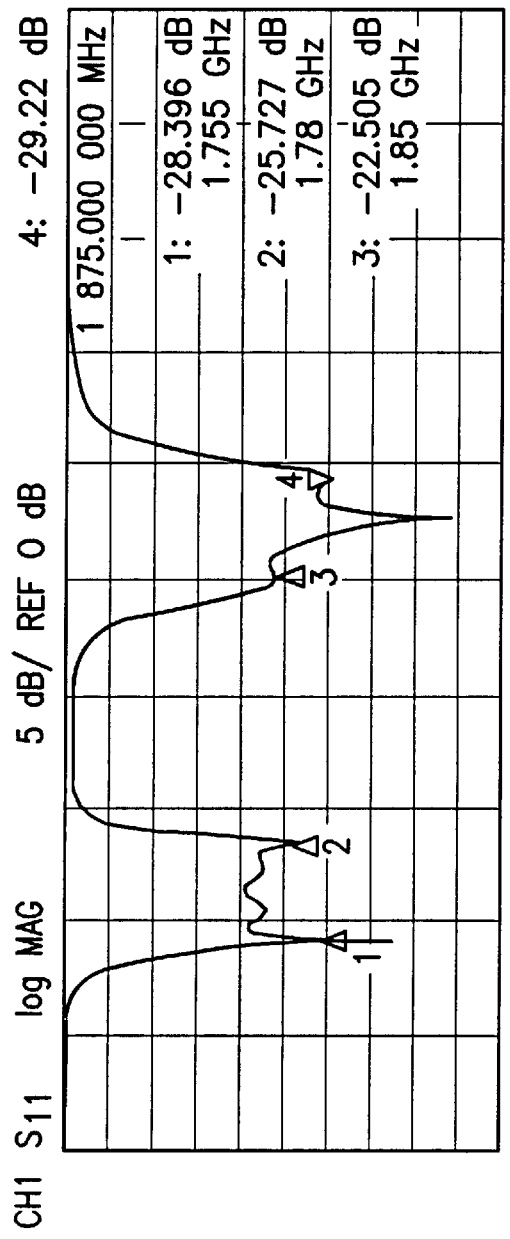
FIGS. 7A, B and 8A, B show a frequency curve relating to a factual design of the embodiment illustrated in FIG. 3.
Figure 7B:
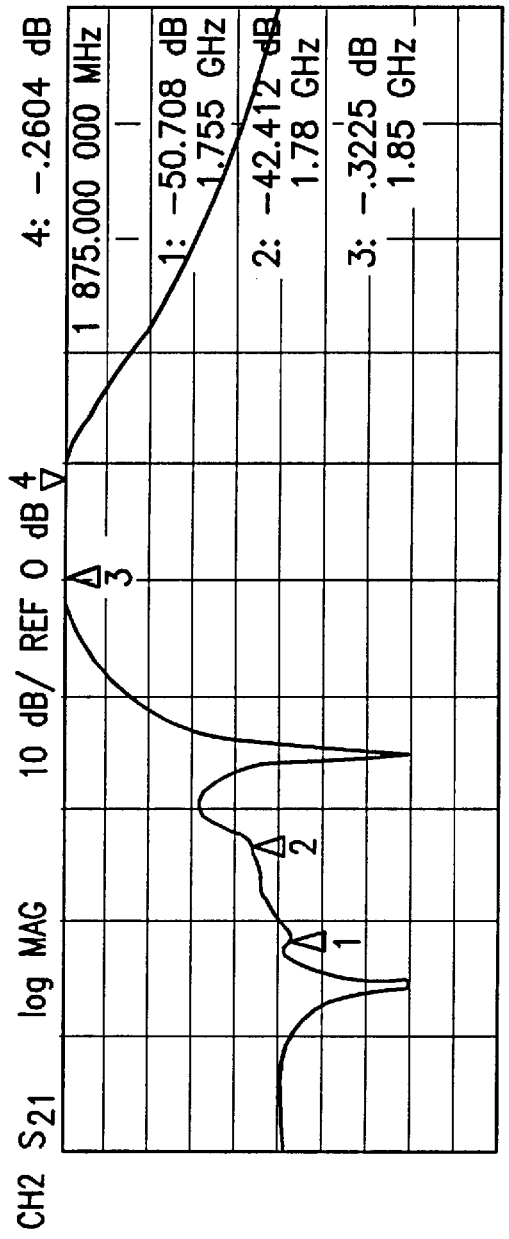

A filter having the configuration shown in FIG. 2 was constructed with three resonators in the Tx part and six resonators in the Rx parts. The intended frequency band limits 1,850–1,875 GHz for Tx and 1,755–1,780 GHz for Rx. FIGS. 7A, B and FIGS. 8A, B show filter curves for Tx and for one of the Rx filters respectively. The A-curves show terminal adaptation and the B-curves show filter transmission. It will be seen from FIG. 8B that the relative attenuation for Tx is above 90 dB in relation to Rx transmission. FIG. 7B shows that the Rx attenuation in relation to the Tx transmission in the Tx band filter exceeds 40 dB. It is therefore possible to achieve a very high degree of separation at particularly low losses in the Tx band (typically 0.2 dB).

Description of a Third Embodiment

As before mentioned, an interest has been shown in the ability to fold the filter box in order to obtain a shorter length. The connections 3 and 4 for the amplifier LNA will then be located closer together, which facilitate their connection to one and the same circuit board.

Figure 9:
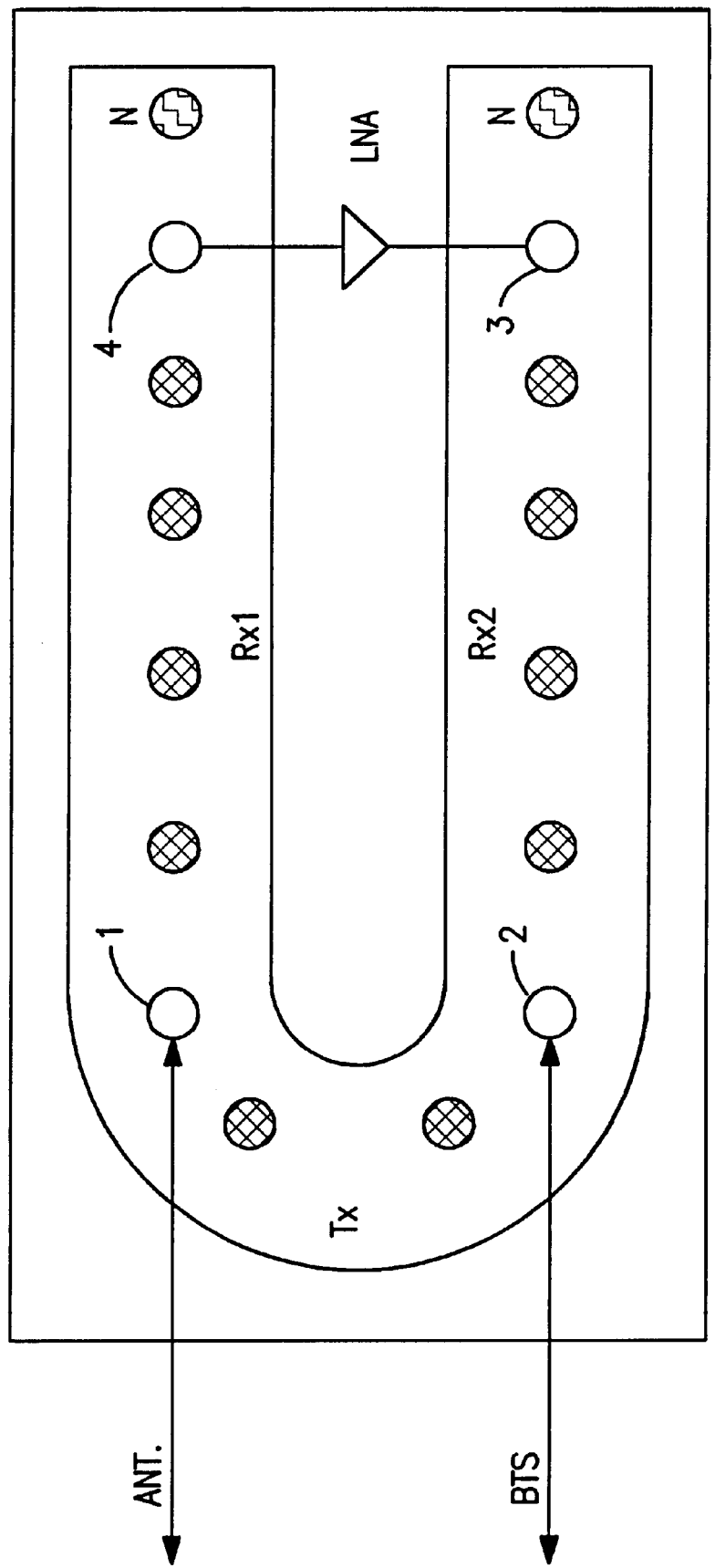
FIG. 9 illustrates schematically a folded dual duplex filter in accordance with the principles of the present invention.

The fundamental concept of the invention has been developed to produce the filter combination shown in FIG. 9. The antenna and transceiver coupling or inputting elements are arranged together with the Tx filter in a curved part of the cavity, whereas the Rx filters are each mounted in respective mutually parallel straight parts of the same cavity, said straight parts forming extensions on both sides of the curved part, which describe an arc of 180°.

The coupling elements to transmitter and antenna are placed approximately at the ends of the bend. The coupling elements 3 and 4 at the opposite ends of the cavities are now spaced at a comfortable distance apart, which facilitates integrated coupling of an amplifier on a circuit board mounted outside the filter construction.

The construction of comb-line filters of the kind to which the invention refers is largely impossible to calculate by analytic processing. The construction is therefore conveniently effected by computer simulation. Generally speaking, the construction is commenced by determining coupling coefficients, i.e. the distances between the successive resonance circuits, by making trial runs and interative calculations, in order to obtain an appropriate bandwidth. This establishes the mechanical construction. Adjustment to the filters is then effected with the aid of a network analyzer.

As mentioned in the introduction, the isolation between the frequency bands Tx and Rx is one of the important factors. This can be achieved in principle either with the aid of filters that have a high pole number, which is accompanied by corresponding high losses, however, or by using, fewer poles and including extra zero poles. Consequently, in the construction shown in FIG. 9, there have been inserted adjacent the coupling elements 3 and 4 notches N which function as narrow-band band stop filters tuned to a tangential frequency between the Rx and the Tx bands. This enhances steepness and separation. Because these elements are loss-free in respective pass-bands, the filter losses are minimized.

As before mentioned, the coupling or inputting elements 3 and 4 function to switch the signal between LNA and Rx filter but are used at the same time to input the notches N. Another important advantage afforded by this type of coupling or inputting element is that third order intermodulation products (IM3) are minimized.

FIG. 10A is a perspective view of an opened filter in accordance with the invention, and FIG. 10B illustrates its removed lid or cover from the inside. FIG. 11 illustrates the "underside" (not seen in FIG. 10A) with a circuit board having a partially exposed, schematically illustrated amplifying circuit. The curved cavity measuring 21×36 mm in cross-section, is accommodated in solid aluminium and silvered on its surface. As with earlier illustrations, the antenna and BTS connections are referenced 1 and 2 and are made with coaxial contacts 1' and 2' while matching to 50 ohms via bent pins which enter the cavity and when the lid is applied are screwed electrically and mechanically to the lid via holes 1" and 2" respectively. Upstanding from the bottom of the cavity in FIG. 10A are posts 10 for Tx and 11 for Rx which function as inductances of the resonances, trimming screws 12 incoming from the lid and forming controllable capacitances for the resonance circuits with the upper surfaces of the posts. The notches N also have capacity determining screws 12 (partially hidden FIG. 10B). The connections 3 and 4 (FIG. 9) are arranged through posts 13 mounted in the lid (FIG. 10B) and exiting through holes in the bottom (FIG. 10A) to circuit board connections 14, to which they are soldered. FIGS. 10A and 10B illustrate the device prior to this manufacturing stage.

Figure 13:
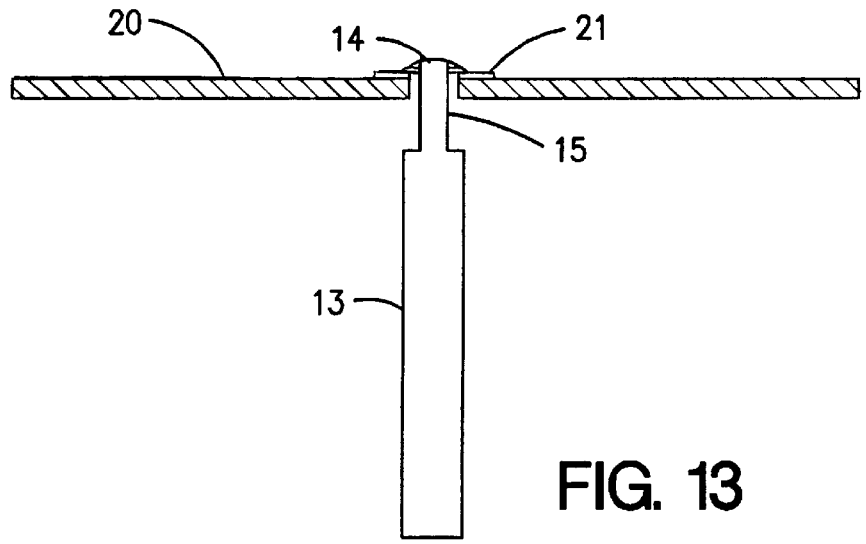
FIGS. 13 and 14 illustrate examples of inductive circuit board inputting.
Figure 14:
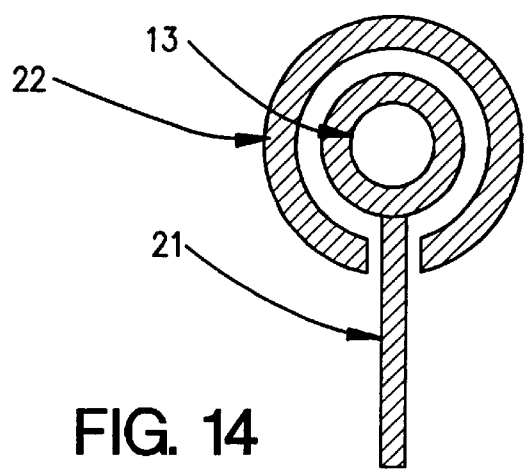

These solder points 14 are shown in FIG. 11, on the right side of the circuit board 20. The circuit board 20 is made of a plastic material that has low losses and is provided on the underside with an earth plane (not shown) which enables the construction of circuits in microstrip and the connections to be connected directly to the filter inputs and outputs intended for the amplifier LNA. This connection is shown in FIGS. 12 and 13. The ends of the posts 13 are narrowed at 15 and inserted through a hole that extends through the circuit board 20 (and through the earth plane), and are connected on the other side of the board to a microstrip conductor 21 by means of a respective solder join 14. This arrangement enables a matching to 50 ohms to be made, and any phase error that may occur can be regulated with a surrounding earth pad 22 (shown in FIG. 14) and a capacitor (not shown). The amplifier LNA has not been shown explicitly on the circuit board illustrated in FIG. 11, but is indicated solely by broken line symbols in view of the fact that an amplifier of this kind is known to the skilled person. Although the illustrated connection between filter and amplifying circuit is an inductive connection, the connection may alternatively be a capacitive connection.

EXAMPLE

Figure 12A:
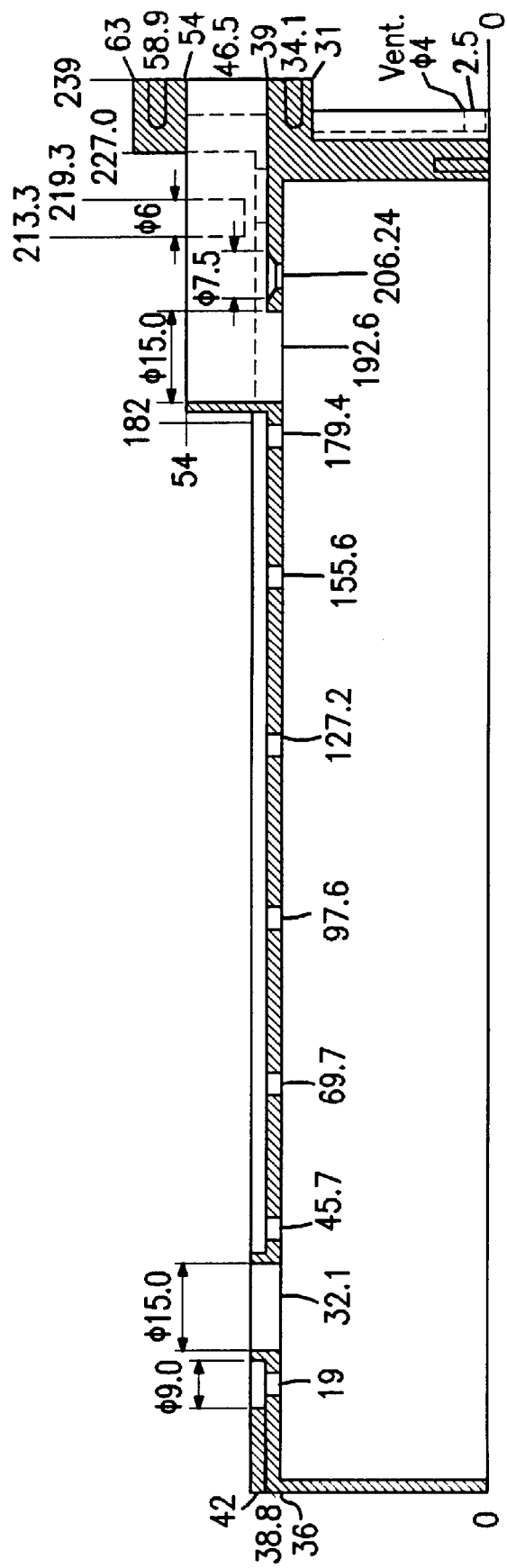
FIGS. 12A–C are drawings of one example of a dual duplex filter on which measurements have been inserted.
Figure 12B:
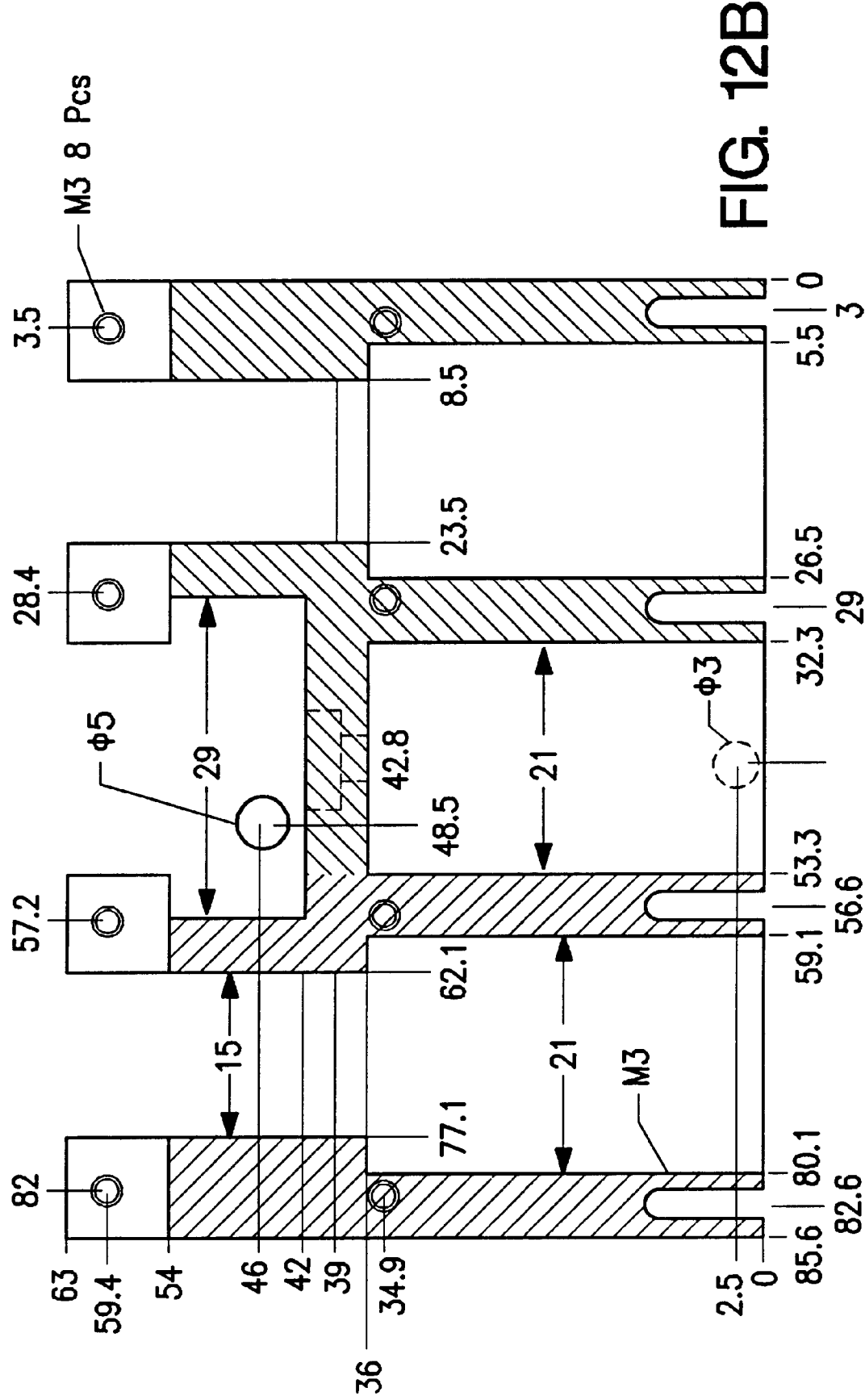
Figure 12C:
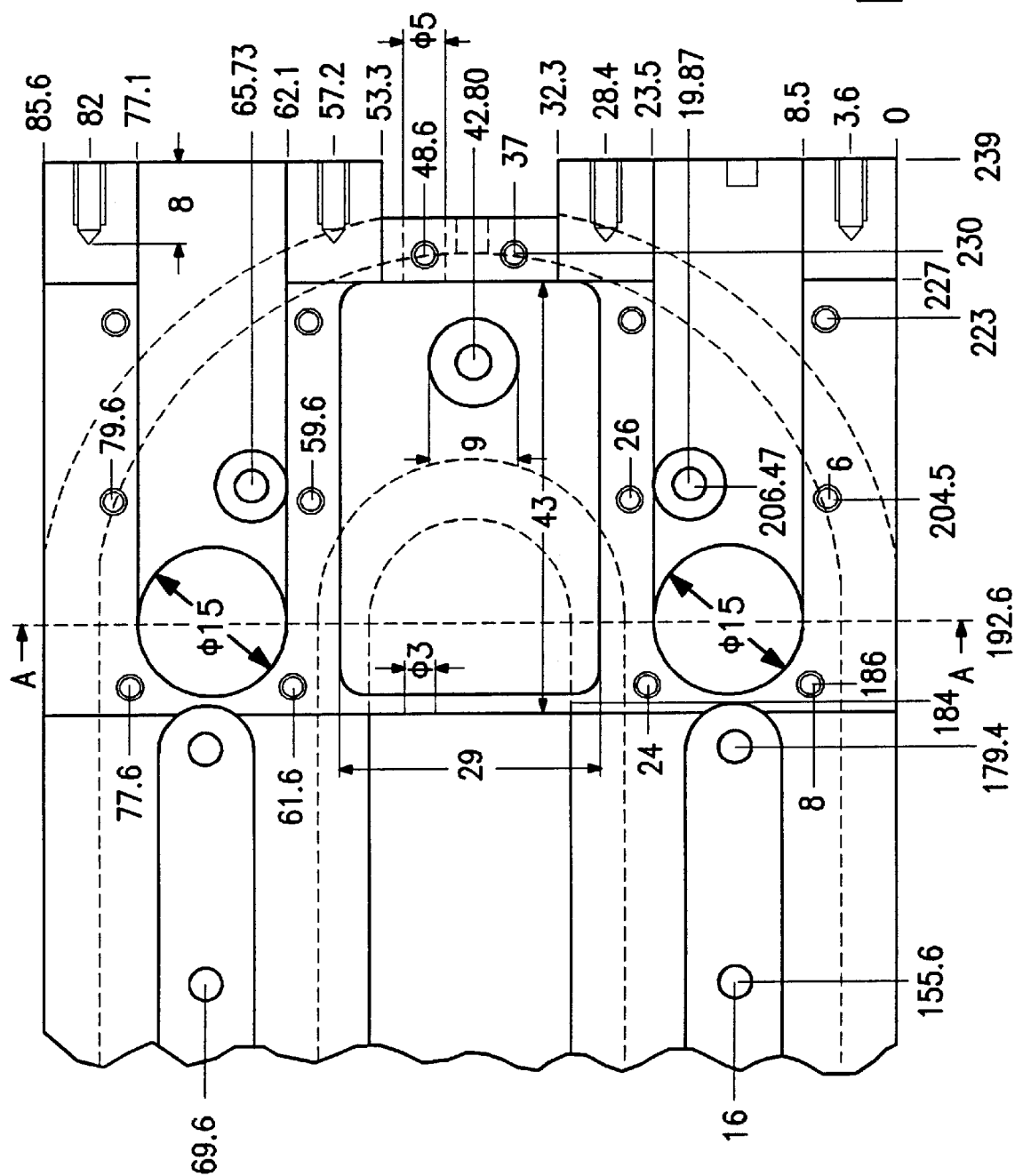

A specific embodiment of a filter combination of the aforesaid kind is illustrated in FIGS. 12A–C in which measurements in millimeters have been inserted and which show views of the arrangement shown in FIGS. 10A, 10B and 11 and from which the complete measurements of an embodiment can be obtained.

Figure 15A:
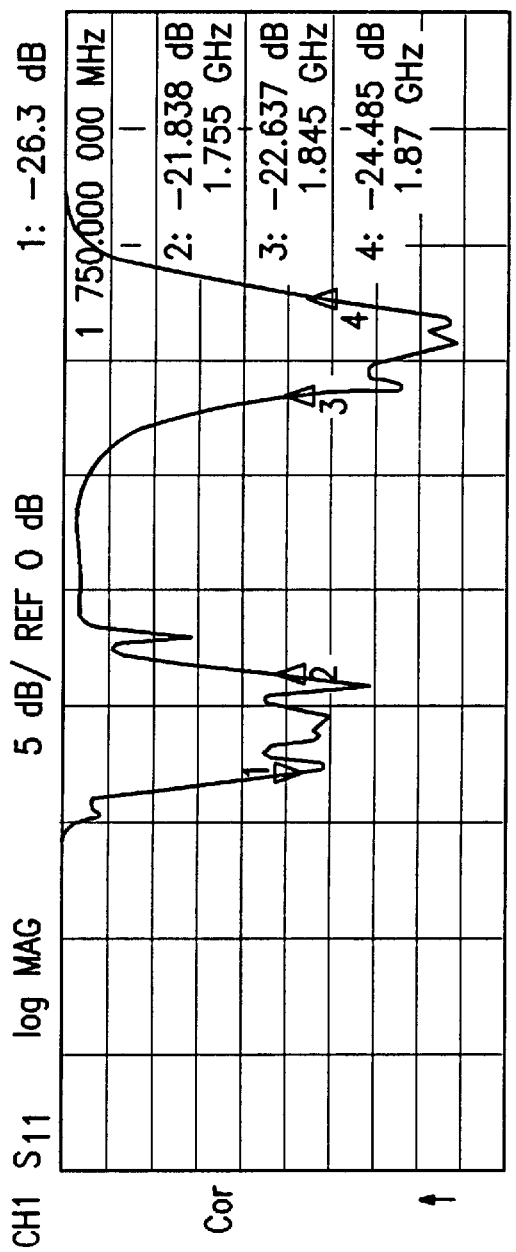
FIGS. 15A, B and 16A, B are diagrams showing frequency curves for adjusted examples of the embodiment shown in FIGS. 12A–C, with a disconnected amplifier and with an amplifier functioning for signals incoming from the antenna side respectively.

Thus, there was constructed a filter having the configuration shown in FIG. 9, although in this case with three resonators in the Tx part and six resonators in the Rx parts. The intended frequency band limits were 1,850–1,875 GHz for Tx, and 1,755–1,780 GHz for Rx. FIGS. 15A, B and 16A, B respectively show the performances of the amplifier construction. The A-curves show terminal matching and the B-curves show the transmission characteristics of TMA.

Figure 15B:
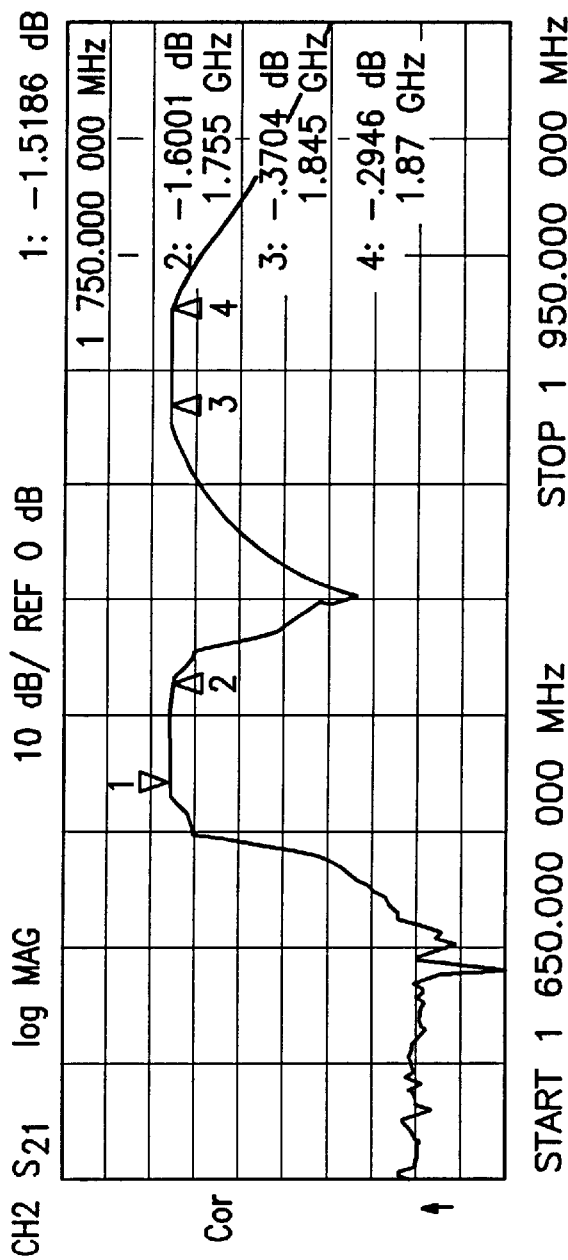
Figure 16A:
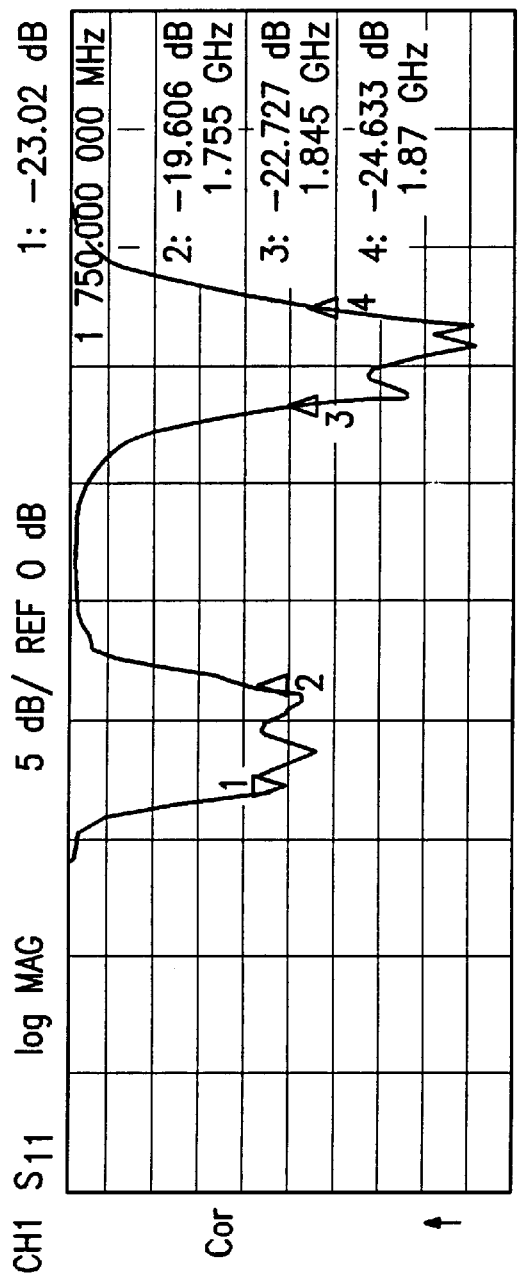
Figure 16B:
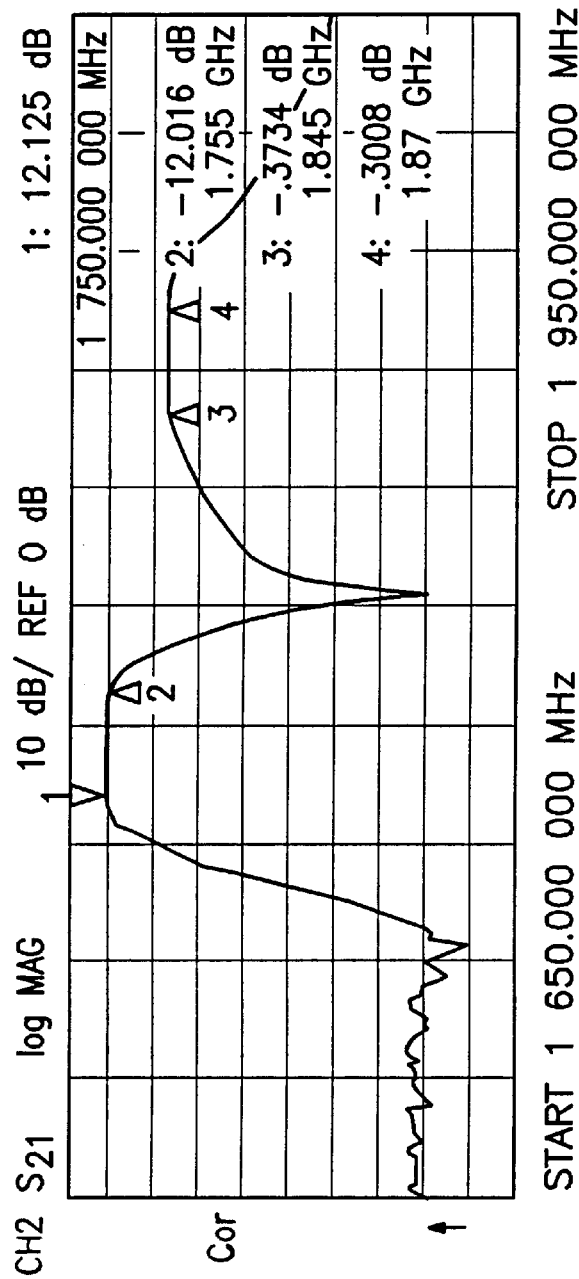

It will be particularly noted in FIG. 16B that signals in the receiver band have been amplified by slightly more than 12 dB. FIG. 15B shows that the construction will not be damaged should the amplifier function fail, because the signals will pass undisturbed through the filter construction.

Figure 17A:
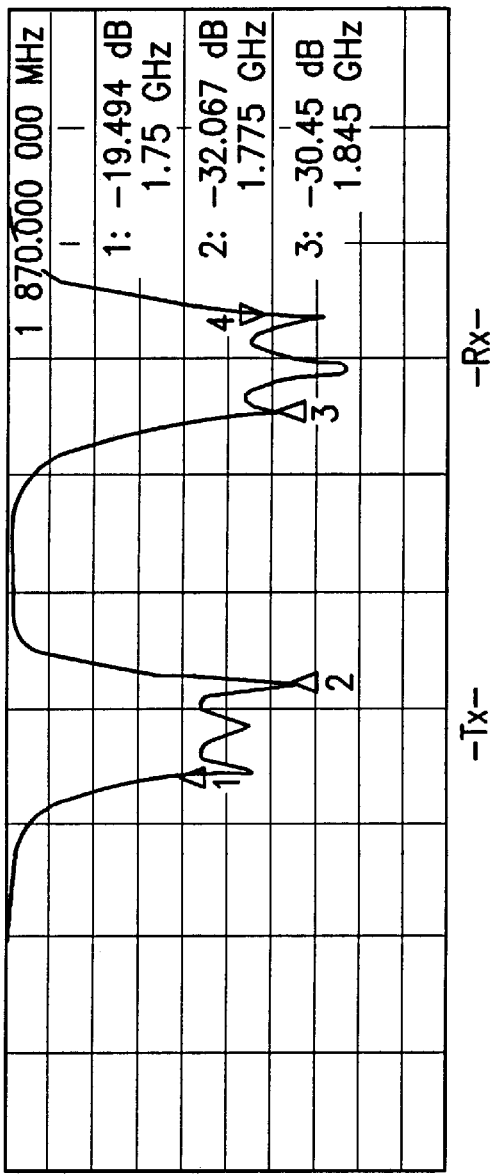
FIGS. 17A, B and 18A, B are diagrams showing adaptation curves and transmission curves respectively for the same embodiment.
Figure 17B:
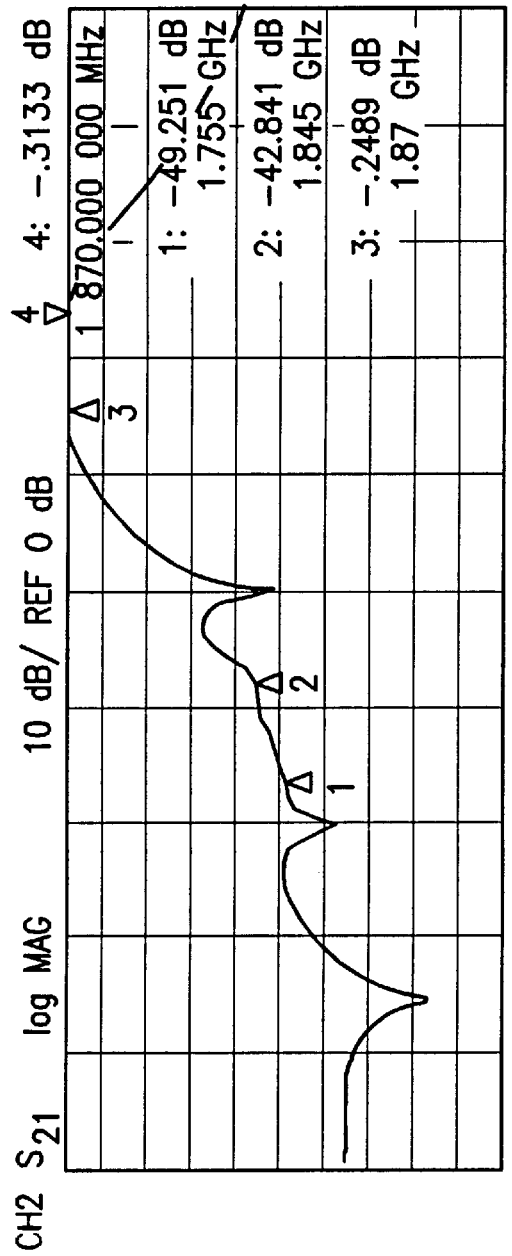
Figure 18A:
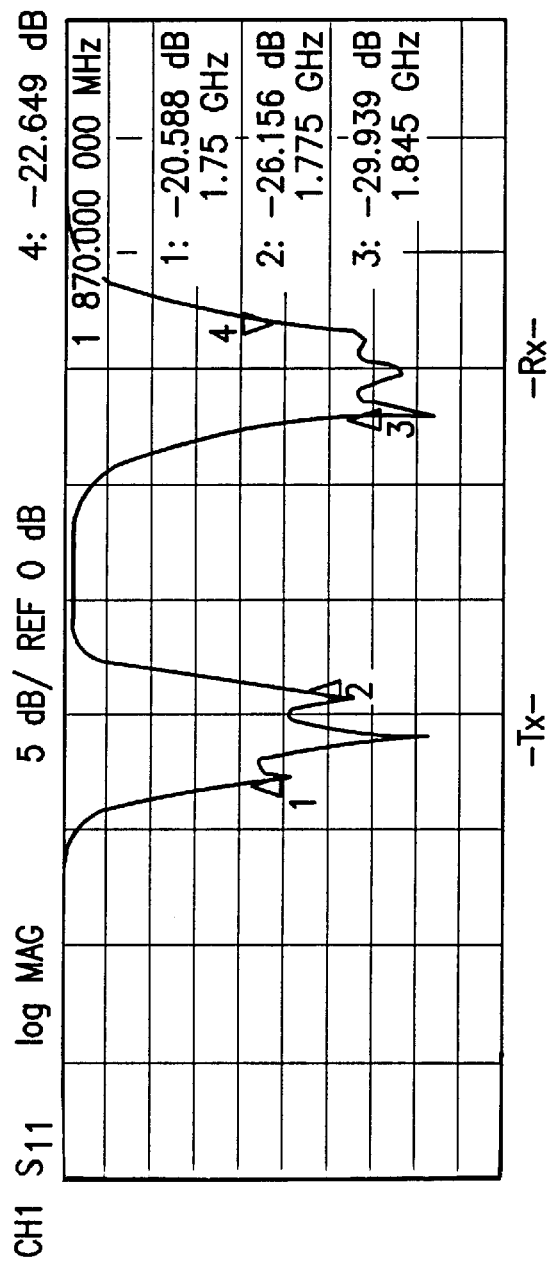
Figure 18B:
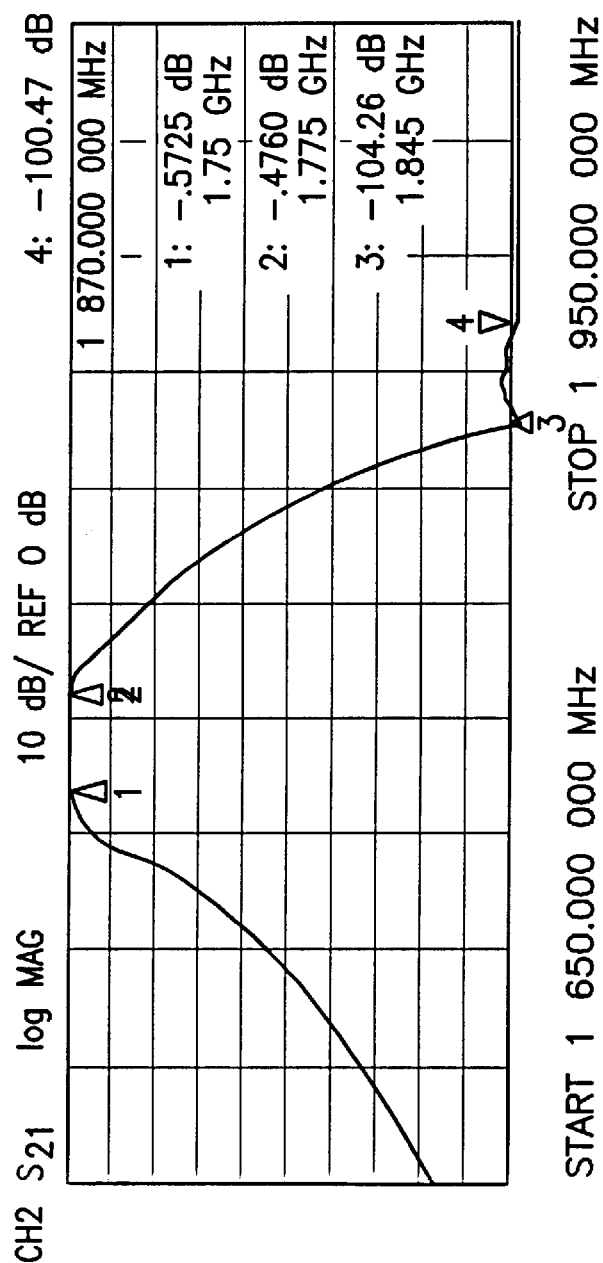

FIGS. 17A and B and FIGS. 18A and B show filter curves for one of the Rx and Tx paths respectively The A-curves show terminal matching. The curve in FIG. 17B shows the transmission between connections 1 and 3 (which is the same as the transmission between 2 and 4, which is not therefore shown), whereas FIG. 18B shows the transmission between connections 1 and 2. The curves show that very high attenuation values are obtained.

The amplifier is a low noise amplifier constructed on a circuit board with the high precision in matching, etc., possible in this technology. This coupling or connection minimizes the losses and can result in an optimized low noise factor for the receiver band Rx.

Figure 20:
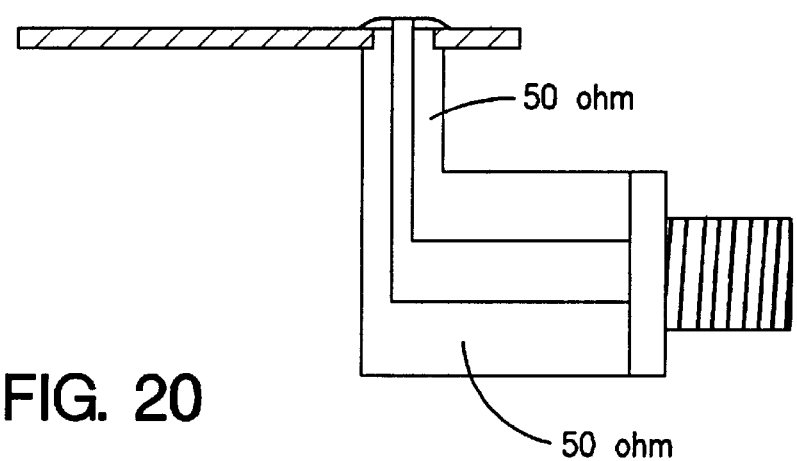
Figure 19:
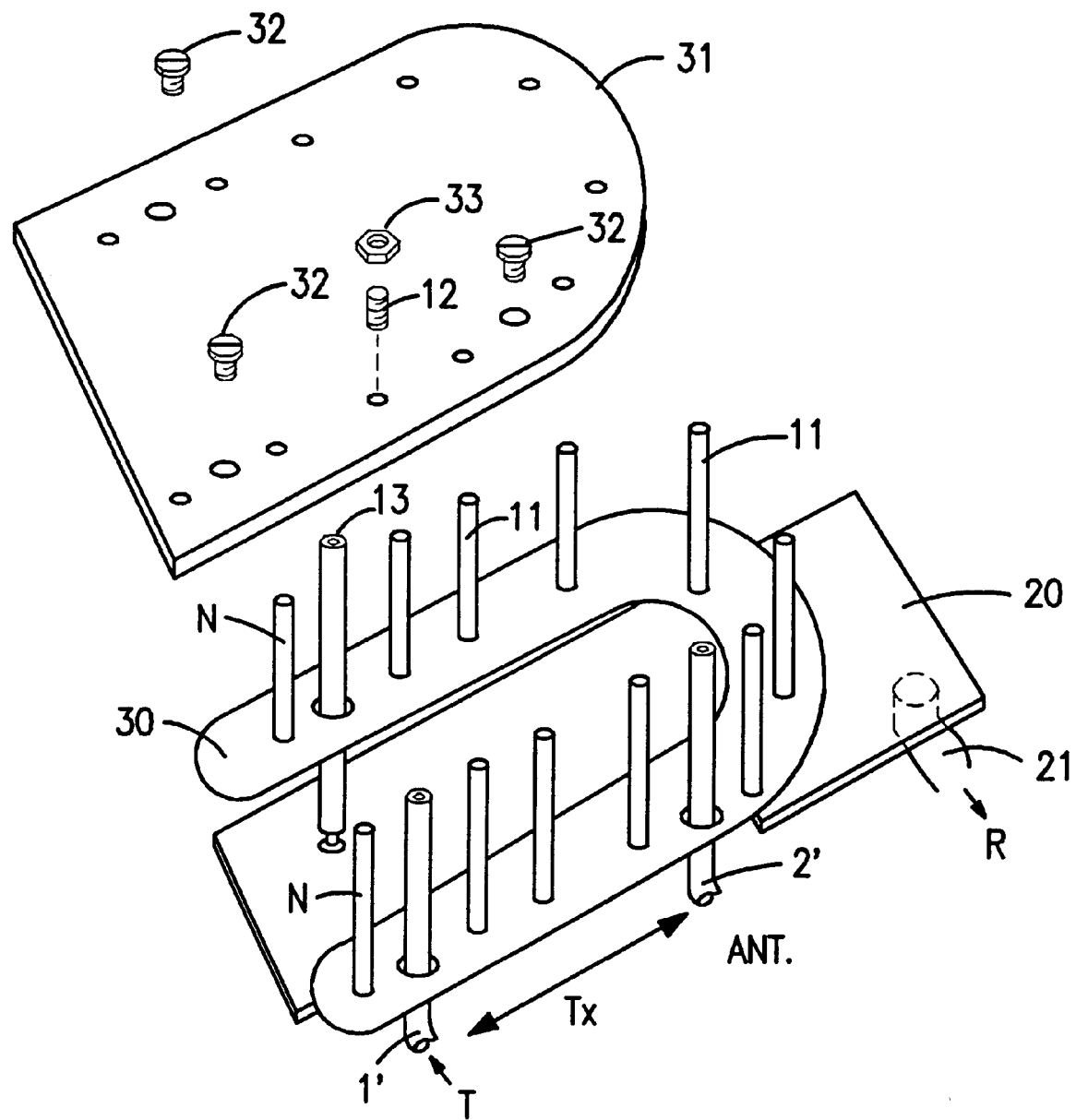
FIG. 19 is a partially exploded view showing the general construction of another embodiment of the invention; and In mobile communication systems, the frequency bands normally lie at 1,700–1,900 MHz and at 800–1,000 MHz respectively. The radio channel spacing between transmitter and receiver bands is normally 20 MHz. This concerns frequency ranges suitable for the application of microwave technology.

As mentioned in the introduction, the invention can also be applied when separate upleads are used for transmitter power output and downleads for the received signals. One such construction is shown schematically in FIG. 19. To provide a better understanding, only a bottom surface 30 with resonator pins 11 and notch pins N of the filter accommodating cavity have been shown, together with an adjacent lid or cover 31. The connector pins 1 and 2 input the transmitter power output to the antenna through the filter located therebetween. The received signal arriving from the antenna passes via the curved filter provided with six resonator poles to the output pin 13 which outputs the signal to the amplifier mounted on the circuit board 20 in the same way as that in the FIG. 13 and 14 embodiment. FIG. 20 clearly shows how this adapted output is applied to a standard coaxial contact. The lid includes screws 32 which are screwed into the input pins 1, 2 and 13 when assembling the device. The lid is, of course, also screwed firmly to the walls (not shown) of the cavity, which similar to the first described embodiment is milled from a piece of aluminium and silvered internally. Each resonator pin 11 is completed in the lid by a trimming screw 12, which is screwed in through an opposing hole and locked by a lock nut 33. Although only one such setup has been shown, it will be understood that a similar setup is provided for each resonator and one for each notch resonator N.

There is obtained in this way a particularly practical monolithic device which has a manageable length by virtue of the curved horseshoe-configuration of the filter construction. As shown, it is possible to place all three connections in a row on one and the same side as coaxial contacts with a mutual spacing which affords comfortable connection and disconnection of coaxial cables.

We claim:

1. An antenna amplifier comprising:
   an antenna connection;
   a transmitter connection connected to said antenna connection via a first bandpass filter for transmitter frequencies;
   a receiver frequency amplifier comprising an output for connection to a receiver and a receiver frequency amplifier input connected to said antenna connection via a second bandpass filter;
   said first and second bandpass filters being mounted in a common, elongated cavity and including comb-line-type resonators arranged generally in rows along a cavity mean line; and
   connection pins at each of two mutually approaching ends of said first and second bandpass filters and at each of two outer ends of said antenna amplifier.

2. An antenna amplifier according to claim 1, wherein the low noise amplifier input and output are inputted to respective filters via capacitive connections to respective input elements intended to this end.

3. An antenna amplifier according to claim 1, further comprising notch resonators provided adjacent the input elements intended for inputting or coupling the low noise amplifier, wherein the notch resonators function as narrow-band band stop filters tuned to a frequency outside the pass band for the frequency band but lying close thereto on that side thereof closest to the first frequency band, by occasioning enhanced isolation between the bands with minimal filter losses.

4. An antenna amplifier according to claim 1, further comprising: connected to the input and to the output of the low noise amplifier first quarter-wavelength conductors terminated with diodes connected to signal earth, and second quarter-wavelength conductors each having a respective connection point for delivery of an input signal and the output of an amplified signal respectively, and third quarter-wavelength conductors connected to said connection points and terminated with diodes connected to signal earth, wherein means are provided for current supply to the diodes to render said diodes electrically conductive, and a by-pass line between the two third quarter-wavelength conductors at their connections to respective diodes.

5. An antenna amplifier according to claim 1, wherein the resonators are disposed in a curved cavity defined by a metal casing.

6. An antenna amplifier according to claim 5, wherein the curved cavity has a horseshoe configuration.

7. An antenna amplifier according to claim 1, further comprising a notch resonator provided on each end of the cavity outwardly of the connecting pins on said ends.

8. An antenna amplifier according to claim 1, wherein two comb-line filters are mounted in the horseshoe-shaped cavity, a first filter for transmitter frequencies fully accommodated in one leg of the horseshoe, a second for receiver frequencies accommodated in a part of the horseshoe comprising the second leg and the curved part of the aperture, wherein the second filter has a larger number of resonators than the first filter.

9. An antenna amplifier for an antenna intended for transmission in a first frequency band and for receiving in a second frequency band which is different from the first frequency band, comprising:

an antenna connection;

a transceiver connection;

a filter means for providing a first frequency-separated conductor path for the first frequency band extending from said transceiver connection to said antenna connection and a second frequency-separated conductor path for the second frequency band extending from said antenna connection to said transceiver connection;

said second conductor path including a low noise amplifier;

said first conductor path including a first resonator-constructed bandpass filter, for the first frequency band intended for transmission, immediately connected between said transceiver connection and said antenna connection;

said second conductor path including a second bandpass filter, said second bandpass filter comprising a first end connected immediately to one end of said antenna connection; and a third bandpass filter comprising a first end immediately connected to said transceiver connection, said low noise amplifier having an input connected to a coupling or inputting element at a second end of said second bandpass filter and having an output connected to a coupling or inputting element at a second end of said third bandpass filter, wherein the pass bands of said second and third bandpass filters correspond to the second frequency band.

10. An antenna amplifier according to claim 9, wherein said low noise amplifier input is connected to said second end of the second bandpass filter in a contact-free and cable-free manner.

11. An antenna amplifier according to claim 9, wherein the first, second and third filters constructed with resonators are each disposed in a cavity having a first cavity part that accommodates the first bandpass filter, the antenna connection and the transceiver connection, and a second and a third cavity part which extend generally parallel with one another and accommodate components of the second and the third filter and which are coupled to the antenna connection and to the transceiver connection respectively via apertures.

12. An antenna amplifier having an antenna connection, a transmitter input connected to the antenna connection via a first transmitter frequency bandpass filter, and an input to an amplifier for receiver frequencies connected to said antenna connection via a second receiver frequency bandpass filter, said amplifier having an output that can be connected to a receiver, wherein the bandpass filters are comb-line filters whose resonators are accommodated in a curved cavity defined by a metal casing, the amplifier is constructed in a circuit board in accordance with microstrip or stripline technology and has an input adaptively connected via a connecting pin embodied at right angles to the circuit board; and a connecting pin is provided at respective ends of the cavity.

13. An antenna amplifier according to claim 12, wherein the curved cavity has a horseshoe configuration.

14. An antenna amplifier according to claim 13, wherein three comb-line filters are arranged in the horseshoe-shaped cavity, each with a respective bandpass filter for receiver frequency at respective legs of the horseshoe-shape, and a bandpass filter for transmitter frequency at the curved part of said cavity, with antenna and downlead connecting pins between the comb-line filters, and a respective connecting pin at the ends of the legs for connection to the input and output respectively of the circuit board-mounted amplifier.

15. An antenna amplifier according to claim 13, wherein the connecting pins connecting the antenna and downlead respectively are each connected to a respective coaxial connection.

16. An antenna amplifier according to claim 12, further comprising a notch resonator provided on each end of the cavity outwardly of the connecting pins on said ends.

17. An antenna amplifier according to claim 12, wherein two comb-line filters are mounted in the horseshoe-shaped cavity, a first filter for transmitter frequencies fully accommodated in one leg of the horseshoe, a second for receiver frequencies accommodated in a part of the horseshoe comprising the second leg and the curved part of the aperture, wherein the second filter has a larger number of resonators than the first filter.

18. An antenna amplifier according to claim 12, wherein the input of the circuit board-mounted amplifier is connected with the aid of a connecting pin whose one end is attached to a cavity wall and the other end of which is extended through a hole in an opposite cavity wall and is in contact with an impedance-adapted circuit board conductor on said circuit board, said connecting pin forming an inductive connection with the circuit board conductor.

19. An antenna amplifier according to claim 12, wherein one end of the connecting pin is attached to a cavity wall and is connected capacitively with an impedance-adapted circuit board conductor on said circuit board, via a hole in an opposite cavity wall.

* * * * *